United States Patent
Yamada et al.

(10) Patent No.: US 7,032,059 B1
(45) Date of Patent: Apr. 18, 2006

(54) METHOD OF DATA TRANSMISSION MANAGEMENT

(75) Inventors: Masazumi Yamada, Osaka (JP); Hiroyuki Iitsuka, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/569,150

(22) Filed: May 11, 2000

Related U.S. Application Data

(63) Continuation-in-part of application No. 09/022,634, filed on Feb. 12, 1998, now Pat. No. 6,101,215.

(30) Foreign Application Priority Data

May 12, 1999 (JP) .................................. 11-130904

(51) Int. Cl.
 *G06F 13/00* (2006.01)
(52) U.S. Cl. ................. 710/313; 710/314; 710/316; 710/10; 710/16; 710/38; 710/37
(58) Field of Classification Search ........ 710/305–306, 710/309–317, 300, 301, 303, 58–65, 72, 710/8–19, 33–35, 105–107, 36–39; 370/254–256, 370/259; 713/1–2, 100
 See application file for complete search history.

(56) References Cited

U.S. PATENT DOCUMENTS

| 4,827,409 | A | * | 5/1989 | Dickson | 710/52 |
|---|---|---|---|---|---|
| 5,535,208 | A | * | 7/1996 | Kawakami et al. | 370/391 |
| 5,576,902 | A | * | 11/1996 | Lane et al. | 386/68 |
| 5,781,599 | A | * | 7/1998 | Shiga | 375/376 |
| 5,790,398 | A | * | 8/1998 | Horie | 710/100 |
| 5,828,656 | A | * | 10/1998 | Sato et al. | 370/254 |
| 5,933,430 | A | * | 8/1999 | Osakabe et al. | 370/395 |
| 6,038,625 | A | * | 3/2000 | Ogino et al. | 710/104 |
| 6,078,783 | A | * | 6/2000 | Kawamura et al. | 725/120 |
| 6,101,215 | A | * | 8/2000 | Takeda et al. | 375/221 |
| 6,169,725 | B1 | * | 1/2001 | Gibbs et al. | 370/216 |
| 6,226,697 | B1 | * | 5/2001 | Tokuhiro | 710/36 |
| 6,298,406 | B1 | * | 10/2001 | Smyers | 710/129 |
| 6,389,496 | B1 | * | 5/2002 | Matsuda | 710/131 |
| 6,414,971 | B1 | * | 7/2002 | James et al. | 370/519 |
| 6,477,605 | B1 | * | 11/2002 | Taki et al. | 710/302 |
| 6,539,443 | B1 | * | 3/2003 | Dunstan et al. | 710/106 |

(Continued)

FOREIGN PATENT DOCUMENTS

EP 0658048 A1 * 6/1995

(Continued)

OTHER PUBLICATIONS

"Isochronous Data Flow Management" Future IEC 1883-Part I, 4 WD 23, Feb. 1996, pp. 11-21 & 28-38.

(Continued)

*Primary Examiner*—Paul R. Myers
*Assistant Examiner*—Raymond N Phan
(74) *Attorney, Agent, or Firm*—RatnerPrestia

(57) ABSTRACT

In a bus system having a plurality of instruments linked to each other, the invention proposes a method which avoids useless data transmission or useless occupation of a data transmission line. A data transmission line is established for starting receipt/transmission of data after available instruments for the transmission/receipt of the date are identified. During the transmission of the data, the enable and disable state of transmission/receipt of the data is monitored and if desired, the data transmission is broken.

45 Claims, 10 Drawing Sheets

U.S. PATENT DOCUMENTS 6,557,067 B1 * 4/2003 James et al. ................ 710/306

FOREIGN PATENT DOCUMENTS

| EP | 0843482 | * | 5/1998 |
| EP | 0 930 747 A1 | * | 7/1999 |
| EP | 1 076 961 B1 | | 2/2001 |
| JP | 10-164534 A | | 6/1998 |
| JP | 10-290247 A | | 10/1998 |

OTHER PUBLICATIONS

European Search Report for EP 00 10 9974, dated Mar. 10, 2004.

ITU-T: "H.245: Control Protocol for multimedia communication", Online, Mar. 1996, International Telecommunication Union, Geneva, (CH) XP002269090, Retrieved from the Internet: <URL: http://www.itu.int/>, retrieved on Feb. 4, 2004, pp. 43, 46-47, 49, 51-53.

Postel, et al., "RFC 959—FTP—File Transfer Protocol", RFC 959, Oct. 1, 1985, XP002144723, Retrieved from the Internet: <URL:http://www.w3.org/Protocols/rfc959/>, pp. 1, 30, 39-42 and 51.

P. Johansson, "IPv4 over IEEE 1394", Online, IETF Drafting Group, Online, XP002269092, Retrieved from the Internet: <URL: http://www.watersprings.org/pub/id/draft-ietf-ip1394-ipv4-14.txt>, retrieved on Feb. 4, 2004, full document.

Bloks, R. H. J.: "The IEEE-1394 high speed serial bus", Philips Journal of Research, Elsevier, Amsterdam, NL, vol. 50, No. 1, 1996, pp. 209-216, XP004008212, ISSN: 0165-5817, full document.

* cited by examiner

Action of a transmitter

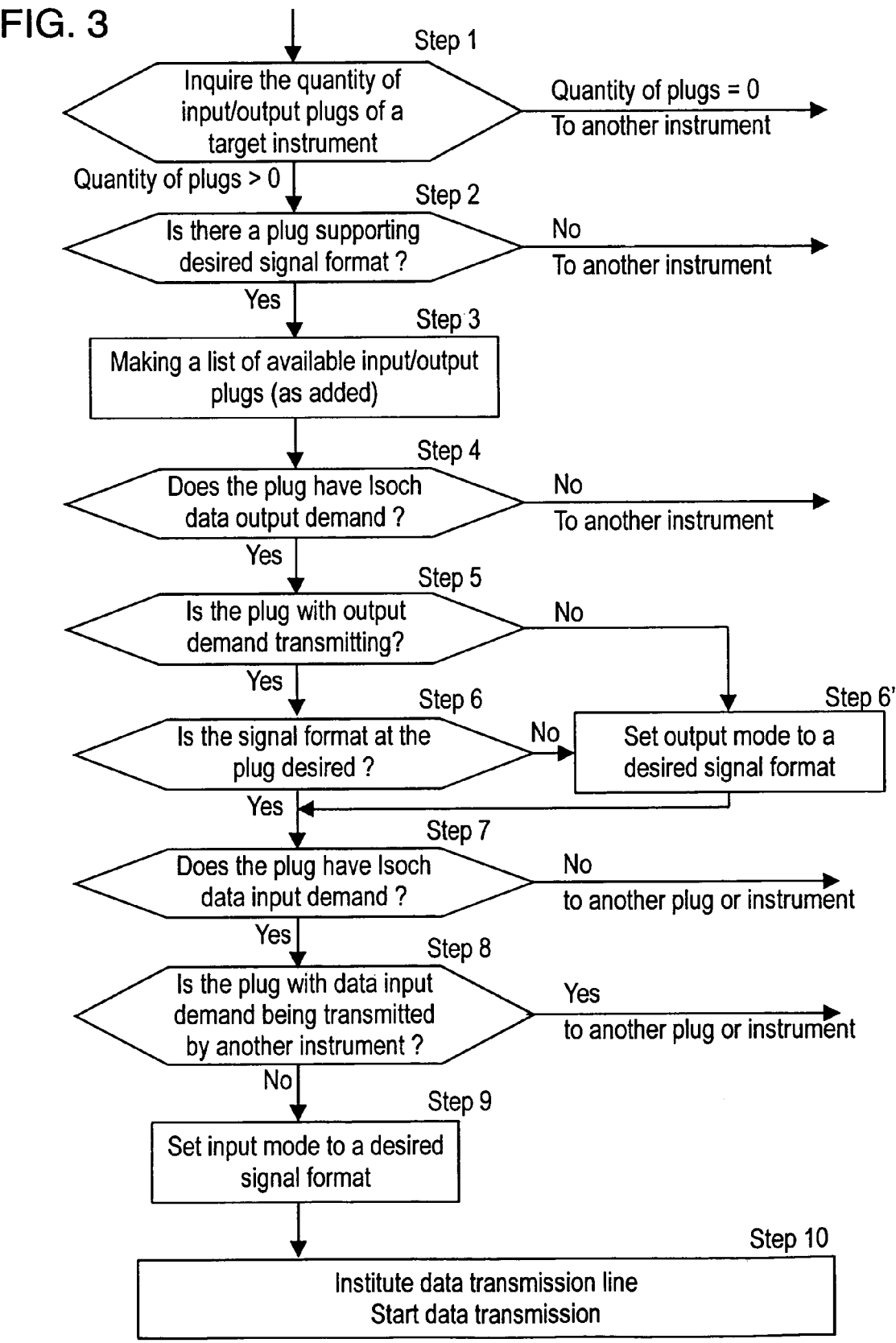

◄──────► p-to-p connection      ◄── ─ ─ ─ Broadcast In connection

◄·············· Broadcast Out connection

FIG. 5A

PLUG INFO status command

|  | msb | | | | | | lsb |
|---|---|---|---|---|---|---|---|
| opcode | \multicolumn{7}{c|}{PLUG INFO ($02_{16}$)} |
| operand[0] | $00_{16}$ |
| operand[1] | $FF_{16}$ |
| operand[2] | |
| operand[3] | |
| operand[4] | |

FIG. 5B

PLUG INFO status response

|  | msb | | | | | | lsb |
|---|---|---|---|---|---|---|---|
| opcode | PLUG INFO ($02_{16}$) |
| operand[0] | $00_{16}$ |
| operand[1] | Serial Bus Input plugs |
| operand[2] | Serial Bus Output plugs |
| operand[3] | External Input plugs |
| operand[4] | External Output plugs |

FIG. 6A

INPUT PLUG SIGNAL FORMAT command

| | msb | | | | | | | lsb |
|---|---|---|---|---|---|---|---|---|
| opcode | colspan="8" | INPUT PLUG SIGNAL FORMAT (19₁₆) |
| operand[0] | colspan="8" | plug |
| operand[1] | 2 | colspan="7" | fmt |
| operand[2] | colspan="8" | (most significant byte) |
| operand[3] | colspan="8" | fdf |
| operand[4] | colspan="8" | (least significant byte) |

FIG. 6B

IOUTPUT PLUG SIGNAL FORMAT command

| | MSB | | | | | | | lsb |
|---|---|---|---|---|---|---|---|---|
| opcode | INPUT PLUG SIGNAL FORMAT (18₁₆) |
| operand[0] | plug |
| operand[1] | |
| operand[2] | FF₁₆ |
| operand[3] | |
| operand[4] | |

FIG. 7A
FLOW_MANAGEMENT notify command

| | msb | | | | | | | lsb |
|---|---|---|---|---|---|---|---|---|
| opcode | FLOW MANAGEMENT (23₁₆) ||||||||
| operand[0] | category ||||||||
| operand[1] | (most significant byte) ||||||||
| operand[2] | category_dependent ||||||||
| ⋮ | ||||||||
| operand[n] | (least significant byte) ||||||||

FIG. 7B
ISOCH_IO_WISH status/notify command

| | msb | | | | | | | lsb |
|---|---|---|---|---|---|---|---|---|
| opcode | FLOW MANAGEMENT (23₁₆) ||||||||
| operand[0] | category = 00₁₆ (ISOCH_IO_WISH) ||||||||
| operand[1] | (most significant byte) ||||||||
| operand[2] | FF₁₆ ||||||||
| operand[3] | ||||||||
| operand[4] | (least significant byte) ||||||||
| operand[5] | (most significant byte) ||||||||
| operand[6] | FF₁₆ ||||||||
| operand[7] | ||||||||
| operand[8] | (least significant byte) ||||||||

FIG. 7C
ISOCH_IO_WISH response

| | msb | | | | | | | lsb |
|---|---|---|---|---|---|---|---|---|
| opcode | FLOW MANAGEMENT (23₁₆) ||||||||
| operand[0] | category = 00₁₆ (ISOCH_IO_WISH) ||||||||
| operand[1] | o sig | op30 | op29 | op28 | op27 | op26 | op25 | op24 |
| operand[2] | op23 | op22 | op21 | op20 | op19 | op18 | op17 | op16 |
| operand[3] | op15 | op14 | op13 | op12 | op11 | op10 | op09 | op08 |
| operand[4] | op07 | op06 | op05 | op04 | op03 | op02 | op01 | op00 |
| operand[5] | i sig | ip30 | ip29 | ip28 | ip27 | ip26 | ip25 | ip24 |
| operand[6] | ip23 | ip22 | ip21 | ip20 | ip19 | ip18 | ip17 | ip16 |
| operand[7] | ip15 | ip14 | ip13 | ip12 | ip11 | ip10 | ip09 | ip08 |
| operand[8] | ip07 | ip06 | ip05 | ip04 | ip03 | ip02 | ip01 | ip00 |

FIG. 8A

DIGITAL INPUT comand

| | msb | | | | | | | lsb |
|---|---|---|---|---|---|---|---|---|
| opcode | \multicolumn{8}{c|}{DIGITAL INPUT ($11_{16}$)} |
| operand[0] | \multicolumn{8}{c|}{connection state} |

FIG. 8B

DIGITAL OUTPUT comand

| | msb | | | | | | | lsb |
|---|---|---|---|---|---|---|---|---|
| opcode | \multicolumn{8}{c|}{DIGITAL OUTPUT ($10_{16}$)} |
| operand[0] | \multicolumn{8}{c|}{connection state} |

FIG. 9A iPCR format

| 1 bit | 1 bit | 6 bit | 2 bit | 6 bit | 16 bit |
|---|---|---|---|---|---|
| on-line | broadcast connection counter | point-to-point connection counter | Reserved | Data Rate | Reserved |

FIG. 9B oPCR format

| 1 bit | 1 bit | 6 bit | 2 bit | 6 bit | 2 bit | 4 bit | 10 bit |
|---|---|---|---|---|---|---|---|
| on-line | broadcast connection counter | point-to-point connection counter | Reserved | Data Rate | Reserved | Overhead ID | Reserved |

FIG. 11
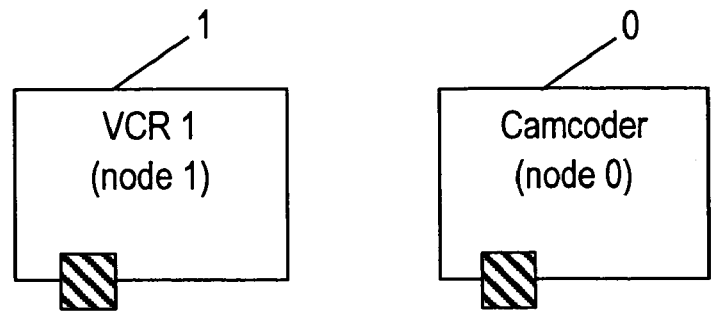
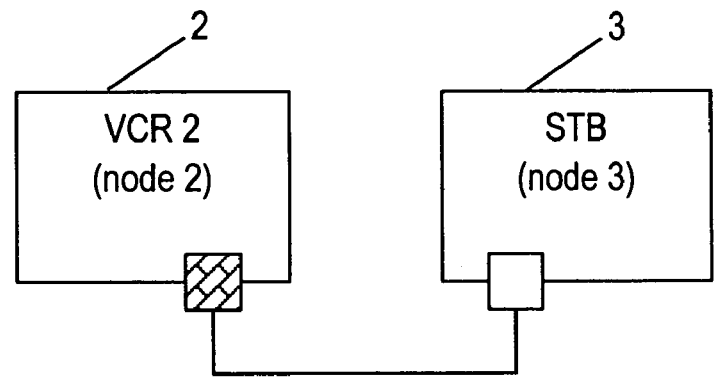
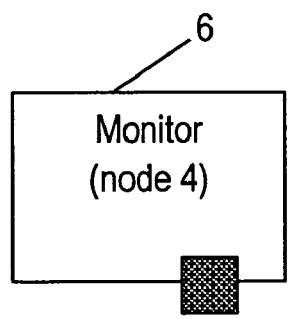

METHOD OF DATA TRANSMISSION MANAGEMENT

This application is a Continuation-In-Part of application Ser. No. 09/022,634, filed Feb. 12, 1998, now U.S. Pat. No. 6,101,215.

BACKGROUND OF THE INVENTION

1. Field of the Invention

The present invention relates to a method of data transmission management for use in, for example, a bus system interconnecting a plurality of instruments.

2. Description of the Related Art

The digital interface, known as IEEE1394, has been proposed as a network which is suited for real-time transmission of audio and video data (referred to as AV data hereinafter) of the MPEG2 transport packet form (referred to as TS packet hereinafter) or the digital video format (referred as DV hereinafter). The IEEE1394 is a serial high-speed bus system which transmits data in isochronous format at synchronous timing, hence enabling real-time transmission of the data. Also, asynchronous data transmission at asynchronous timing can be made in parallel with the isochronous data transmission.

The IEEE1394 permits a maximum of 63 instruments to be connected over a single local bus. The cable of each instrument can be connected or disconnected while the instrument is being energized. Upon an instrument being applied or removed, its connection can automatically be identified to reconstruct the network.

The IEEE1394 can be installed as an external interface in a variety of digital audio and video instruments. A combination of the IEEE1394 and its AV data transmission mode or AV protocol (specified in IEC 61883: Specifications of digital interface for consumer electronic equipment) permits, for example, two DV instruments to be communicated each other for data transmission and digital dubbing. Also, any other asynchronous transmission mode than the AV protocol may be used such as AV/C digital interface command set or asynchronous connection for delivering control commands, including Play and Stop, to AV instruments.

In the IEEE1394, multi-channel AV signals can be transmitted over a single connector. Also, both the input and output of a signal can be carried out through a single connector. The AV protocol assigns a plug as an imaginary connector for receiving or transmitting a single channel. Hence, two types of plugs are needed for input and output respectively; the input plug receives data on a single channel and the output plug transmits data on a single channel. This requires an instrument to have N input plugs for receiving N channels of the isochronous packet and have N output plugs for transmitting N channels of the isochronous packet.

A register (PCR, plug control register) is provided for assigning the channel to be handled or determining the on/off action. The PCR is classified into two types, iPCR for input and oPCR for output. The PCR is located in an address area of the IEEE1394 and can thus be read out directly using an asynchronous packet or modified in the value. Hence, no dedicated control commands are needed for controlling input and output of a signal and the PCR is also embodied in a hardware.

The PCR is thus utilized in a connection management procedure (CMP) of the AV protocol for signal connection between instruments. The CMP is classified into three different signal connection methods: 1) broadcast out connection, 2) broadcast in connection, and 3) point-to-point (p-to-p) connection. Their concepts are illustrated in FIG. 4. FIG. 4 shows an exemplary bus system of plugs where a camcorder 0, a VCR 1, a VCR 2, an STB (set top box, a satellite broadcast receiver) 3, a monitor 4, and a controller 5 are interconnected by the IEEE1394 bus as shown in FIG. 10.

The broadcast out connection is established between an output plug and a channel. Referring to FIG. 4A, the camcorder 0 is linked by the broadcast out connection to the 63rd channel. The 63rd channel and the monitor 4 are linked by the broadcast in connection. Accordingly, data from the camcorder 0 is received by the monitor 4 over the channel as a medium.

The broadcast out connection may be broken by any other instrument. For instance, when its PLAY button switch of the VCR 2 is pressed by a user, the VCR 2 may break the broadcast out connection from the camcorder 0 and run an application of establishing a broadcast out connection to the 63rd channel. In this case, the monitor 4 is linked to the 63rd channel by the broadcast in connection and thus its displaying-image is automatically shifted to an image from the VCR 2.

The VCR 2 detects that the 63rd channel to which its image is released is linked to another instrument (the camcorder 0) and reads out an oPCR at the instrument. When also acknowledging that the 63rd channel engages simply the broadcast out connection, the VCR 2 breaks the broadcast out connection by rewriting the oPCR.

As a result, the camcorder 0 stops releasing the isochronous packet to the 63rd channel and thus allows the VCR 2 to establish the broadcast out connection to the 63rd channel.

When a protected signal connection between two dedicated instruments is desired, it employs the p-to-p connection. As shown in FIG. 4, the p-to-p connection between the STB 3 and the VCR 1 is established over the 61st channel. The p-to-p connection is a one-to-one connection which can hence be broken only by the instrument which established the connection. The p-to-p connection may be established by an output instrument, an input instrument, or a third instrument. For example, the p-to-p connection between a playback VCR and a recording VCR may be established by the controller 5. Also, two or more of the p-to-p connections may be overlaid with a single output plug. Moreover, two or more of the p-to-p connections may be overlaid with a single input plug or two or more input plugs.

However, the above mentioned connection management method of the CMP has following drawbacks.

First, the p-to-p connection may create useless isochronous transmission. Characteristic examples of the useless isochronous transmission are:

1-1) that the p-to-p connection which is established by a third instrument may continuously be maintained while no actual data is transmitted or empty packets are delivered. Also, the p-to-p connection which is established by a third instrument or a transmitter may be maintained while the transmitted data is not used by the receiver. The isochronous transmission assigns a bandwidth before starting the transmission and, when the transmission is finished, restores the bandwidth. A resultant case may be that the bandwidth is allocated to another instrument hence disabling the isochronous transmission from the transmitter. The p-to-p connection may lead to useless data transmission, thus disturb the effective data transmission;

1-2) that the data received over the p-to-p connection established by a transmitter or a third instrument may not always favorably be used by a receiver; and 1-3) that the data transmitted over the p-to-p connection established by a receiver or a third instrument may not always be guaranteed by a transmitter. This will result in useless data transmission.

Secondly, the broadcast out connection does not identify a receiver and may hence permit no instruments to be responsible to data receipt. Accordingly, such useless data transmission will decline the available overall transmission capability in a limited resource for data transmission.

Thirdly, any instrument which intends to establish the broadcast in connection is not contemplated for finding an instrument which is ready for establishing the broadcast out connection. For example, as the receiver is not informed of any instrument which is ready to transmit data before actually receiving the data, it has to examine channels over which the data of interest is transmitted.

SUMMARY OF THE INVENTION

The present invention provides a data transmission management method of, in a bus system having a plurality of instruments linked to each other, managing to establish and breaking a data transmission line between the instruments according to the response to an inquiry asking whether the data transmission or receipt is permitted or not.

When a signal format of a data of interest is changed, the management for establishing and breaking a data transmission line between the instruments can be made corresponding to the change.

Also, a third instrument can be used, in the bus system having a plurality of instruments linked to each other, which inquires the other instruments for the availability of data transmission and data receipt respectively. According to responses to the inquiry of the other instruments informing the availability of data transmission and data receipt, the third instrument manages to establish or break a data transmission between the other instruments.

BRIEF DESCRIPTION OF THE DRAWINGS

FIG. 3 is a flowchart showing a procedure of the third instrument searching instruments available for transmission and receipt of a data according to Embodiment 5 of the present invention;

FIGS. 5A and 5B are diagrams illustrating PLUG INFO command and response;

FIGS. 6A and 6B are diagrams illustrating an INPUT PLUG SIGNAL FORMAT command and an OUTPUT PLUG SIGNAL FIORMAT command;

FIGS. 7A, 7B and 7C are diagrams illustrating ISOCH_IO_WISH commands and a response;

FIGS. 8A and 8B are diagrams illustrating a DIGITAL INPUT command and a DIGITAL OUTPUT command;

FIGS. 9A and 9B are diagrams illustrating an iPCR format and an oPCR format;

FIG. 11 is an image view showing visually an example of a connection.

DETAILED DESCRIPTION OF THE PREFERRED EMBODIMENTS

Modes for embodying the Invention

Figure 4A:
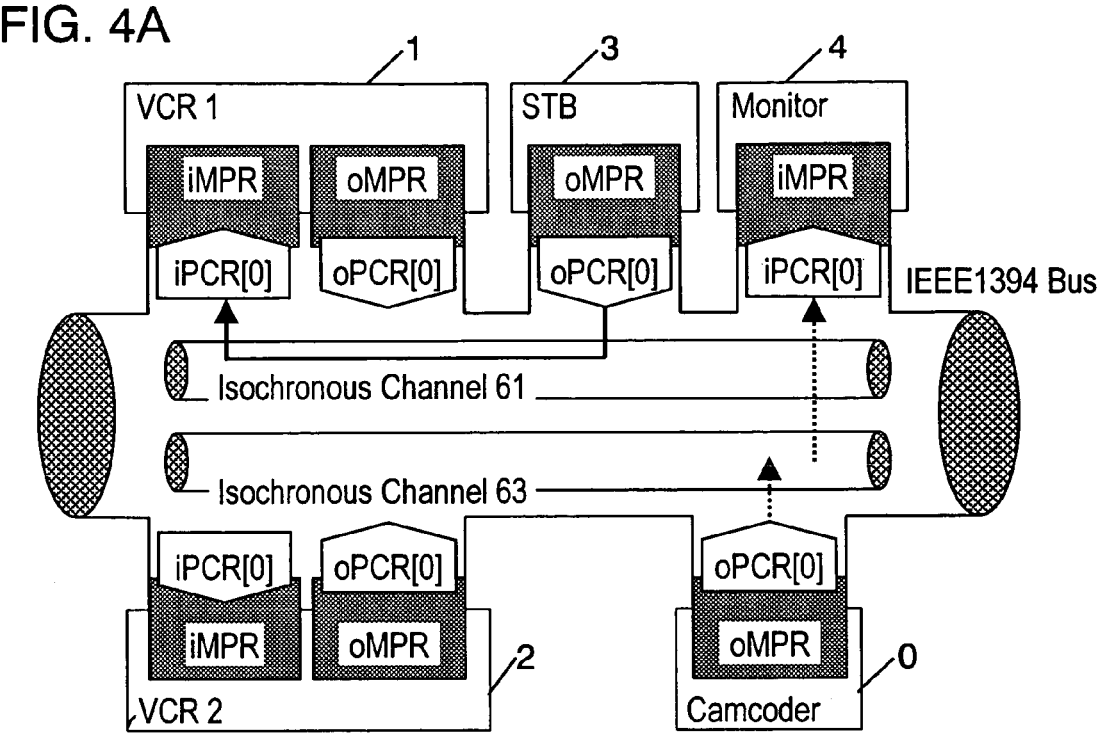
FIGS. 4A and 4B are schematic view illustrating the concept of plugs in a CMP.
Figure 4B:
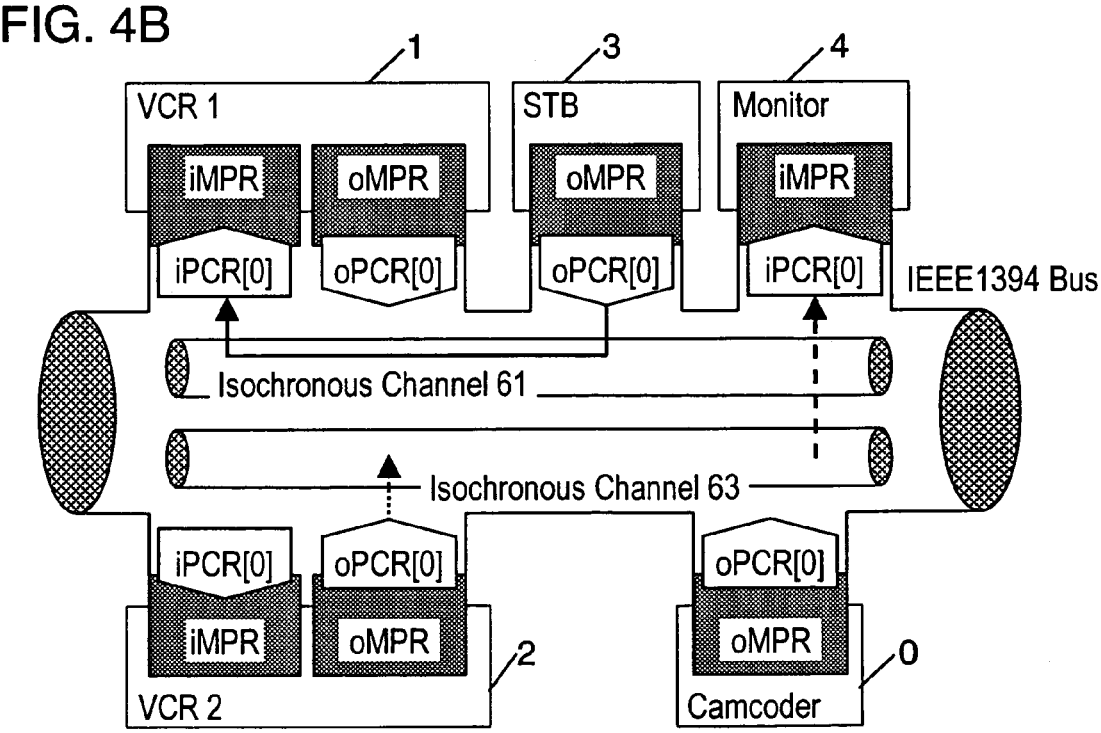

The following embodiments demonstrate a transmission management method of the present invention over a bus system conformed to the IEEE1394 illustrated in FIG. 4.

Embodiment 1

Assuming that the transmitter is a camcorder 0 and intends to transmit an AV data, a procedure of the transmitter searching an instrument which receives the data will be described referring to the flowchart of FIG. 1.

At Step 1, the transmitter addresses a PLUG_INFO status command to each instrument for inquiring the quantity of input plugs of the instrument. The PLUG_INFO status command is one of the commands specified in "AV/C digital interface command set general specification, Ver. 3.0" issued on Apr. 15, 1998 by the IEEE1394 Trade Association as used for inquiring the quantity of input or output plugs of a target instrument. FIGS. 5A and 5B show details of the command. When the transmitter intends to transmit the data from its serial bus output plug, it addresses the command, shown in FIG. 5A, to the target instrument for inquiring the quantity of serial bus input plugs.

The target instrument when receiving the command shown in FIG. 5A releases a response of the format shown in FIG. 5B. The response shown in FIG. 5B comprises; Serial_bus_input_plugs field carrying the quantity of isochronous input plugs, Serial_bus_output_plugs field carrying the quantity of isochronous output plugs, External_input_plugs field carrying the quantity of external (analog) input plugs, and External_output_plugs field carrying the quantity of external (analog) output plugs.

Figure 1:
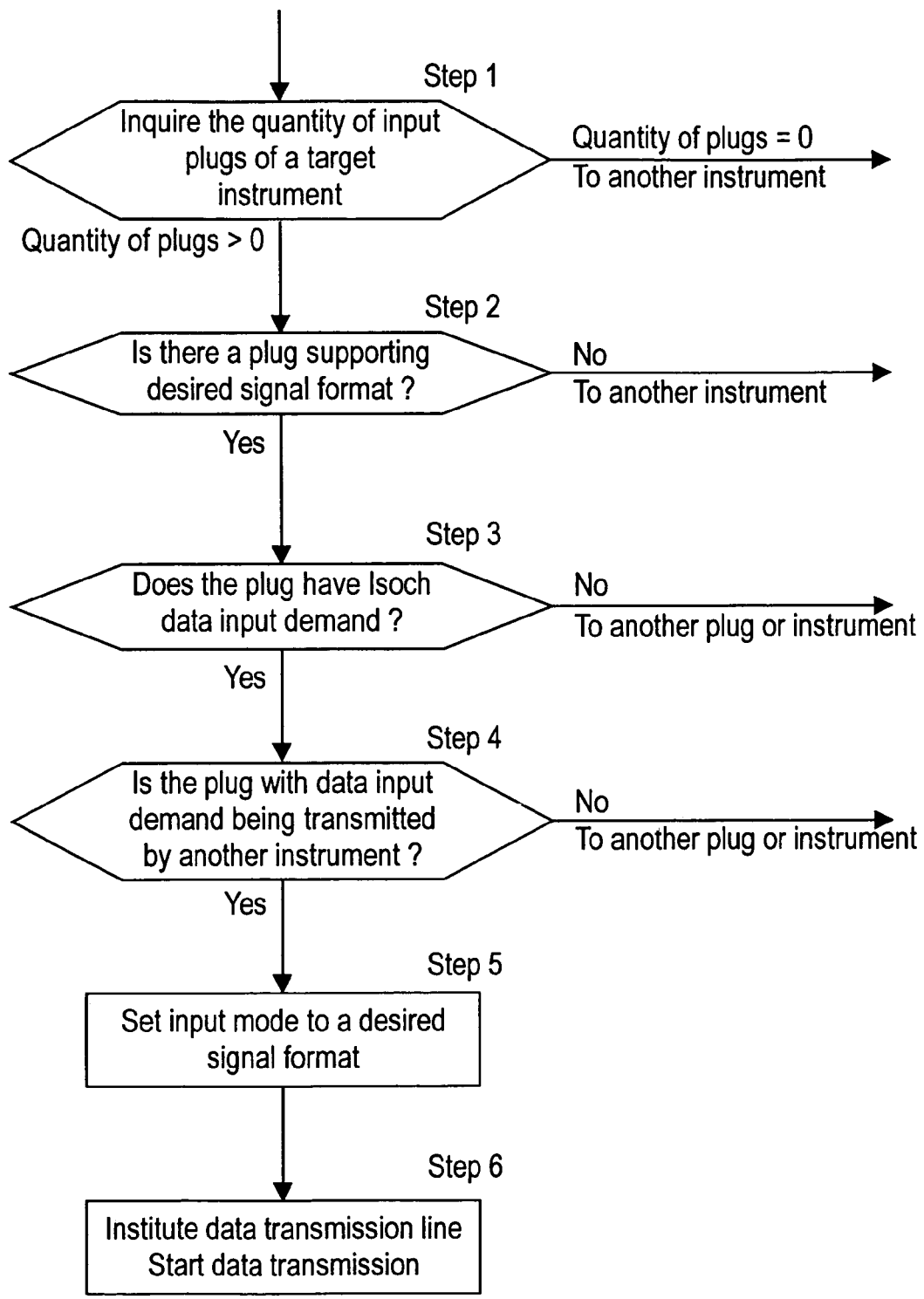
FIG. 1 is a flowchart showing a procedure of the transmitter searching an instrument available for receipt of a data according to Embodiment 1 of the present invention.

When the target instrument has the input plugs, the procedure goes to Step 2 of FIG. 1 where an INPUT_PLUG_SIGNAL_FORMAT inquiry command is addressed for inquiring whether or not each the input plug is capable of receiving the signal. The INPUT_PLUG_SIGNAL_FORMAT inquiry command is also assigned in the AV/C command set. Its format is shown in FIG. 6A. When a specific signal format of the data, e.g. having two, fmt and fdf, fields, is transmitted from the camcorder 0 to a desired plug of the target instrument identified by the quantity saved in the plug field, it is needed to examine whether or not the desired plug is capable of receiving the data of the specific signal format, for example, "NTSC (525/60) compatible DV format". If none of the plugs of the target instrument is capable of receiving the data of the specific format from the transmitter (i.e. the response indicates "NOT_IMPLEMENTED"), it is judged that the target instrument is not responsive to the data of the specific format and the procedure repeats Step 1 for inquiring another instrument.

When it is found that the input plug is capable of receiving the data, the procedure moves to Step 3 of FIG. 1 where it is inquired whether or not the plug is ready to receive the data. The inquiry may be made using an ISOCH_IO_WISH status/inquiry command as shown in FIGS. 7A, 7B and 7C. The command has such a hierarchy as shown in the figure for common use as compatible with the AV/C command format.

As shown in FIG. 7A, a FLOW_MANAGEMENT command is introduced for use as the AV/C command. The FLOW_MANAGEMENT command can carry a plurality of functions denoted by the bits in the category field. The category_dependent field can hold information about size or specific definition depending on the category fields.

As shown in FIG. 7B, with the category field standing at 00, the FLOW_MANAGEMENT command carries the ISOCH_IO_WISH command. The other fields which are determined by the target instrument inquired, i.e. ipN, opN, i_sig, and o_sig, which will be described later, are filled with is for transmission in the command.

The ISOCH_IO_WISH command of this embodiment can be used as both of the notify command mode and the status command mode in common. With the status command mode, the target instrument addresses its status in response to the command. With the notify command mode, the target instrument addresses its status in response to the command and, when its status is changed, notifies the status change. Both of the status command and the notify command are identified by four bits from the fifth to the eighth bit in the AV/C command, also known as ctype, while the other bits are identical.

In the response shown in FIG. 7C, ipN (N=00, 01, ... , 30) represents a connection demand bit; when its value is 0, it indicates "the plug at the number N demands no data input" and when its value is 1, indicates "the plug at the number N demands data input". The value of the bit is irresponsible for actual input of data. For instance, when the data input is requested, no data receipt may occur. Also, when i_sig is 0, it indicates "any input plug accepts the same signal format as before" and when i_sig is 1, indicates "any input plug accepts a signal format which is different from the previous format". Be noted that the signal format may be selected from DV, MPEG2-TS, audio data formats, and so on defined with two particular fields, fmt and fdf. The bit of i_sig is always 0 in the response to a status command or the first response to a notify command. By reading this bit in the response, it is determined which plug demands the data input. When the notify command is received, the response is made indicating the current status of the plug demanding the data input and, after the applicable signal format is changed, indicating its change. For example, as with a camcorder, ip00=0 is given for the camera shooting mode or for the PLAY/CUE/REVIEW actions of the tape playback mode. When the Stop, FF, or REW action is selected, the input of isochronous packets is allowed and ip00 is shifted to 1. Also, in the REC Pause mode, ip00=1 is given.

In a VCR 1, ip01=0 is given for the PLAY/CUE/REVIEW actions of the tape playback mode. When the VCR 1 is in Stop/FF/REW, the input of isochronous packets is permitted and ip01 is shifted to 1. In the REC pause action, ip01=1 is given. While other data is being recorded on the VCR 1, ip01=0 is given.

In a STB 3, ip03=0 represents the output of program data and ip03=1 represents the decoding and output of external data.

When a monitor displays a program from its built-in tuner, ip04=0 is given. While a program data from another instrument is received and displayed, ip04=0 is given. Indicated by ip04=1 is the decoding and output of external data.

When a built-in decoder in the monitor is switched from DV to MPEG decoding mode, the response to the notify command of the monitor is made with the i_sig flag shifted to 1.

The procedure advances to Step 4 of FIG. 1 when there is an input plug demanding the data input and judges from reading iPCR of the plug whether or not the plug demanding the data input is receiving a signal from another instrument. When it is judged that the signal from another instrument is being received, the procedure goes back to Step 2 for examining another plug which demands the data input. If no plug demands the data input, the procedure returns back to Step 1 for checking another instrument.

When the input plug demands the data input and is receiving no data from any other instrument, the procedure goes to Step 5 of FIG. 1. The transmitter addresses an INPUT_PLUG_SIGNAL_FORMAT control command to the target instrument to shift the signal format of the input plug from its current format to the format of the data to be transmitted.

As the signal format of the input plug has been matched by the command, the status is ready for receiving the data input with no data receiving from another instrument and the procedure goes to Step 6. It may also be a case that the signal format of the input plug is not changed as desired due to conditions of the receiver. This is followed by releasing an ISOCH_IO_WISH notify command or repeating the procedure from Step 2 for inquiring another plug or Step 1 for searching another instrument.

It is assumed that while the camcorder 0 intends to transmit a data of the DV format, the target monitor is ready to receive an MPEG signal and accepts no DV data. Then, the camcorder addresses the ISOCH_IO_WISH notify command to the monitor which in turn transmits a response carrying ip00 –30 of the each plug status and the i_sig flag of 0. Upon the status shifted to the acceptance of the DV format e.g. by the connection of a built-in decoder of the monitor switched from one to another mode, the i_sig flag is turned 0 to 1 in the response. When receiving the i_sig flag of 1, the camcorder identifies the signal format of the input plug and transmits the DV data to the monitor.

More specifically at Step 6 of FIG. 1, the transmitter provides p-to-p connection between its output plug and the input plug of the target instrument for establishing a transmission line to transmit the data. Since the ISOCH_IO_WISH command can indicate "the connection allows transmission of a valid data" and "the input data is utilized at its entirety as not wasted", the internal connection is not needed for modification.

If the transmission of the data is rejected because of no input plug of each instrument accepting the signal format of the data, demanding the input of the data, or being available as engaging with the input of data from another instrument, the transmitter judges that the data may be received by no other instrument and breaks the transmission of the data. The ISOCH_IO_WISH notify command allows the transmitter to monitor the status of each input plug of the target instrument, whether engaged with the input of a signal from another instrument or demanding no data input, and thus proceed its procedure efficiently.

When the transmission or receipt of data is no more requested, the transmission line should be disconnected to terminate the data transmission. Its procedure is explained below. In this embodiment, the transmitter establishes the p-to-p connection and its responsibility is to break the p-to-p connection. Accordingly, when the transmission of data is no more needed, the transmitter simply breaks the p-to-p connection. At the other end, the receiver detects no input of data and breaks its action.

When the receiver intends to terminate the receipt of data but is not eligible to break the p-to-p connection, it has to notify the transmitter that the transmission of data is no more requested and allows the transmitter to break the p-to-p connection. For the purpose, the ISOCH_IO_WISH notify command can be used. As the data transmission is established, the transmitter feeds once again the receiver with the ISOCH_IO_WISH notify command. This allows the receiver to shift the ipN bit to 0 for the engaged plug when the demand of data input from the plug is ceased and releases the final response. Alternatively, the receiver shifts the i_sig to 1 for the engaged plug when the signal format is changed to another with the demand of data input being maintained and then delivers the final response. The transmitter then acknowledges from the final response having the ipN of 1 bit that the plug is disengaged from the current data transmission and breaks the p-to-p connection for the plug. When no instruments are engaged with the p-to-p connection, the transmitter terminates its transmitting action or proceeds another action.

More particularly, when the i_sing is shifted to 1, the transmitter uses an INPUT_PLUG_SIGNAL_FORMAT status command for checking whether the signal format of the engaged plug on its p-to-p connection is changed or not. When the format is changed, the p-to-p connection for the plug is broken. If not, the p-to-p connection is maintained.

Embodiment 2

This embodiment is differentiated from Embodiment 1 by the fact that the p-to-p connection is replaced by a broadcast connection for establishing a transmission line. Step 1 to Step 5 are identical to those of Embodiment 1 and will be described in no more detail.

For the p-to-p connection, the transmitter which intends to have the p-to-p connection assigns the resources including a channel and a bandwidth, determines the channel, data rate, and overhead-ID, and shifts the point-to-point connection counter from 0 to 1 in an iPCR or oPCR format such as shown in FIG. 9. The point-to-point connection counter may be overlaid by incrementing the target instrument or another instrument by one.

For establishing the broadcast connection, the transmitter assigns the resources including a channel and a bandwidth, determines the channel, data rate, and overhead-ID, and shifts the broadcast connection counter to 1 in the iPCR or oPCR format shown in FIG. 9.

The p-to-p connection can be established by any of a transmitter, a receiver, and a third instrument rewriting the iPCR or oPCR according to its rules. However, the broadcast connection counter in the iPCR or oPCR can be shifted to 1 by the instrument of which the plug is engaged. For example, it is prohibited that the broadcast connection counter in the iPCR is shifted to 1 by either the transmitter or the third instrument. More specifically, the broadcast in/out connection may be established by no external instrument. An AV/C command is provided for an external instrument requesting the receiver/transmitter to establish the broadcast in/out connection.

More particularly, a DIGITAL_OUTPUT command such as shown in FIG. 8B is modified with its connection_state set to 70 (establish) and transferred to the instrument in charge which in turn proceeds actions required for establishing the broadcast out connection, including assigning the resources. Also, the broadcast in connection is established by the instrument when receiving a DIGITAL_INPUT command such as shown in FIG. 8A having the connection_state set to 70 (establish).

In this embodiment, the transmitter assigns the resources by itself to establish the broadcast out connection at Step 6 of FIG. 1 as well as identifies the number of the channel and writes down the channel number into the iPCR which remains in its input READY state (i.e. it is ready to receive the data but not having received the data so far). The transmitter then addresses the DIGITAL_INPUT command with connection_state set to 70 (establish) to the receiver for establishing the broadcast in connection. As both the broadcast in connection and the broadcast out connection are established over the single channel, a resultant transmission line between the transmitter and the receiver can be established.

A procedure of breaking the transmission line established by the above procedure when the output or input of data is no more desired and of terminating the data input will now be described. In this embodiment, when the data transmission is no more desired by the transmitter, the transmitter can simply break its broadcast out connection to terminate the data transmission. Accordingly, the receiver may detect no input of the data and stop its action.

The receiver can simply break its broadcast in connection when decides to stop the data transmission. Also, if the receiver intends to halt the useless data transmission but disables to identify the transmitter continuing to transmit the data when desires no more data to be received, it can addresses to the transmitter the DIGITAL_OUTPUT command having the connection_status set to 60 (break) to break the broadcast out connection. It is also possible that the receiver clears off the broadcast connection counter bit in the oPCR to break the broadcast out connection. Moreover, the receiver may inform the transmitter that the data transmission is no more desired using the ISOCH_IO_WISH notify command which has been supplied by the transmitter, hence allowing the transmitter to stop the data transmission. In the latter case, where another instrument is possibly receiving over a channel the data from the transmitter, it is desirable that the receiver before demanding the transmitter to stop the data transmission over the broadcast out connection may read the iPCR from the another instrument to determine that its broadcast in connection is not liked to the channel.

According to the procedures described with Embodiment 1 and Embodiment 2, the transmitter manages to establish and break the data transmission line. Ensuring the judgment whether its data transmission is useless or not, the transmitter can halt the data transmission which is no more desired to avoid the useless data transmission.

The commands for inquiring the quantity of input plugs, the support of a desired signal format, the standby for data input, and the receipt of another signal at each step of the flowchart shown in FIG. 1 are not limited to those of the previous embodiments and may be in any form capable of pursuing the inquiries. The ISOCH_IO_WISH notify command applied as shown in FIG. 7 may be replaced by repeating the status command or a single command which carries the selection of the signal format and a group of the inquiries. For example, the ISOCH_IO_WISH notify command is added with the fmt and fdf fields allowing the receiver to issue the demand for data transmission based on the signal format defined by the fmt and fdf fields upon receiving the notify command. In this case, when the signal format is changed with the demand for data transmission being maintained, the bit at each port is cleared off to 0 and thus the assignment of bits to i_sig and o_sig may not be needed.

The sequence of the inquiries is not limited to that of the previous embodiments of the present invention and may arbitrarily be modified.

Although the transmission line is established by, but not limited to, the transmitter for performing data transmission in Embodiment 1 and Embodiment 2, it may be established by the receiver.

For example, when the transmitter identifies the available input plug and transmits a data to it over its broadcast out connection, the receiver which demands for receiving the data checks on which channel the date is transmitted and establishes the p-to-p connection to the channel to receive the data. If the data is not available, the receiver may break the transmission line.

Embodiment 3

Figure 2:
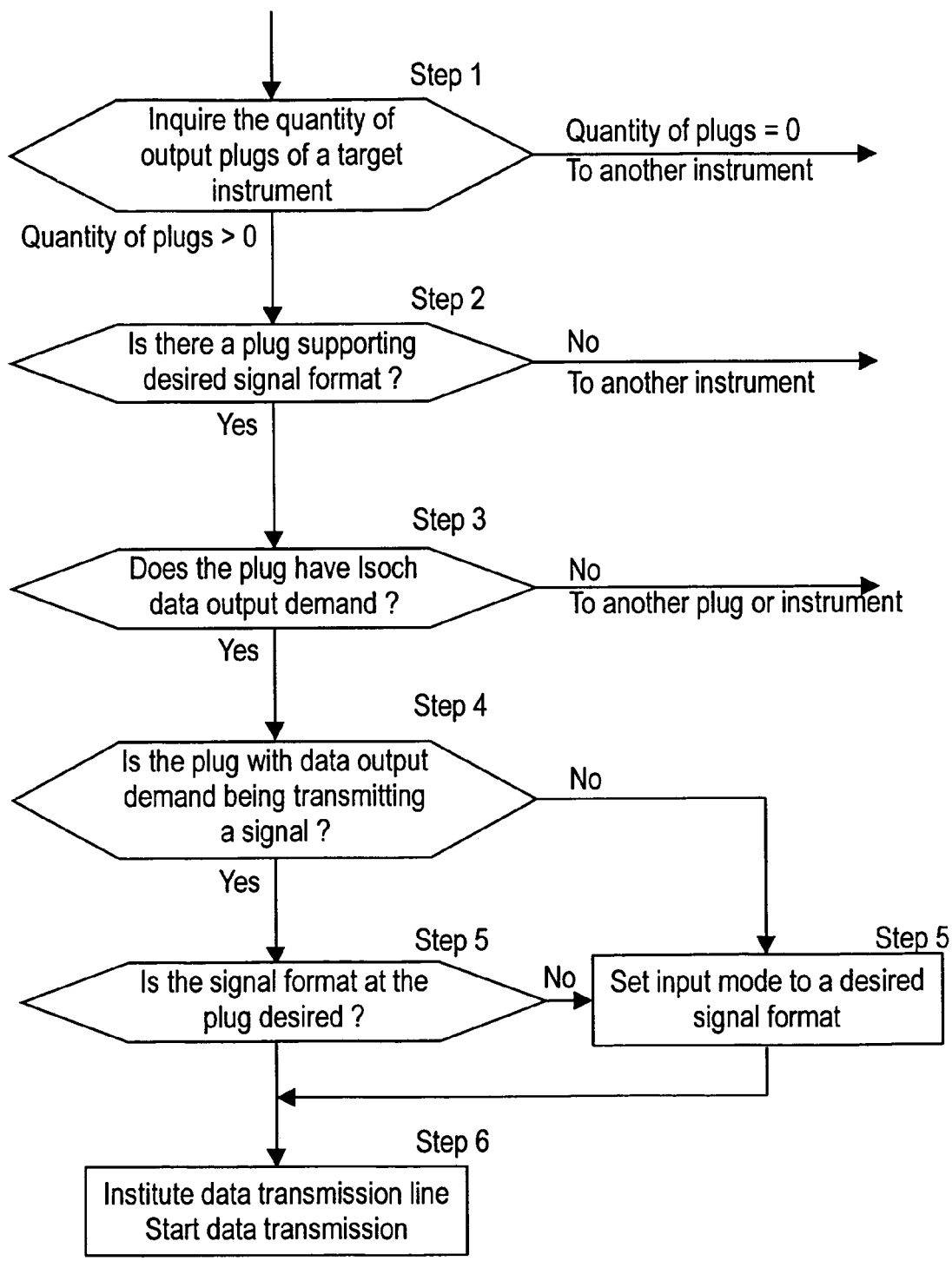
FIG. 2 is a flowchart showing a procedure of the receiver searching an instrument available for transmission of a data according to Embodiment 3 of the present invention.

A procedure of the receiver searching a transmitter for receiving an AV data from the transmitter is described referring to FIG. 2.

At Step 1, the receiver addresses a PLUG_INFO status command such as shown in FIG. 5A to each instrument for inquiring the quantity of output plugs of the instrument. When the desired input plug is not available on the instrument, the inquiry is shifted to another instrument.

When the desired output plug is available on the target instrument, the procedure goes to Step 2 of FIG. 2 where the receiver addresses an OUTPUT_PLUG_SIGNAL_FORMAT inquiry command to inquire whether or not the output plug supports a desired signal format of the AV data to be. The OUTPUT_PLUG_SIGNAL_FORMAT inquiry command is specified in the AV/C command set. Its structure is shown in FIG. 6B. For example, the camcorder 0 shown in FIG. 4 intends to receive a signal format of a data which is defined with two, fmt and fdf, fields and inquiries the plugs of a instrument for availability of the data in a desired format, e.g. "NTSC (525/60) compatible DV format". If any plug of the instrument is not engaged with the desired format (i.e. the response indicates "not implemented"), Step 1 of FIG. 2 is repeated for inquiring another plug.

When the output plug is available for transmitting the data of the desired format, the procedure advances to Step 3 where it is inquired whether or not the output plug is then ready for transmission of the data. The inquiry is made using a newly assigned ISOCH_IO_WISH command. As shown in FIG. 7C, the response includes connection demand bits opN (N=00, 01, . . . 30) which each stands at 0 when "the Nth output plug demands no output" and 1 when "the Nth output plug demands output". This bit does not imply whether or not the output plug is actually in action for transmitting isochronous packets. For instance, when op00 is 1, the 0th output plug may be either releasing the data or not.

As with a camcorder 0, op00=1 is given for the camera shooting mode and for the PLAY/CUE/REVIEW actions in the tape playback mode. In the STOP, FF, and REW actions, op00<0 is given as no practical data is released regardless of transmission of isochronous packets. If no tape is loaded, op00=0 is given. In a VCR 1, the PLAY/CUE/REVIEW actions in the tape playback mode are made at op01=1. In the STOP, FF, and REW actions, op01=0 is given as no practical data is released regardless of transmission of isochronous packets. Also, when data output is disabled in the tape recording mode, op01=0 is given. In an STB, the output of a program data stands at op03=1 and the display of a menu such as a program guide at op03=0. As with a monitor, op04=1 is given when a program received from its built-in tuner is displayed and its data is ready to be transferred to the outside. When a program data received from another instrument is displayed and no data output is enabled, op03 is 0.

When a value of o_sig is 0, it indicates "each the output plug accepts the same signal format as before". When 1, it indicates "any the output plug accepts a signal format different from the previous signal format". This bit is always 0 in the response to a status command or in the first response to a notify command.

Assuming that a VCR is compatible between the MPEG2-TS format and the DV format, the signal format of a data from a tape being played back can be shifted from the DV signal to the MPEG2-TS signal when the recording area of the tape changes from DV to MPEG2-TS format. The VCR receiving the notify command then releases a response with o_sig shifted to 1. Also, when the DV format signal is changed from NTSC mode to PAL mode, the response is also made with o_sig of 1.

The plug with an output demand can thus be identified by reading the bit in the response. Also, as the notify command has been transmitted, it is used as a response when the input or output ready status is changed and when the signal format accepted by the output plug is changed. When the output plug which is capable of transmitting a desired signal format has no output demand, it is considered to be not available for the data transmission due to the current conditions of an internal plug connection. For instance, a VCR with no tuner can transmit no data when it is not loaded with any tape. The action at Step 3 of FIG. 2 for inquiring another output plug for output demand is needed.

When the output plug has an output demand, the procedure goes to Step 4 where it is determined from oPCR whether or not the output plug is transmitting a data.

When the data is being transmitted through the output plug, it is examined whether or not the data is in a desired signal format. When the data is in the desired signal format, the procedure advances to Step 6. If the data is not in the desired signal format, the action for receiving the data is broken.

When the data is not being transmitted through the output plug, an OUTPUT_PLUG_SIGNAL_FORMAT control command is released to change the output format to the desired signal format. As the signal format at the output plug of the transmitter has been changed in response to the control command, it is acknowledged that the data transmission is ready and the procedure moves to Step 6.

The above procedure for changing the signal format at the output plug may be found difficult due to the conditions in the receiver. In that case, an OUTPUT_PLUG_SIGNAL_FORMAT notify command is released to change the output format to the desired signal format. Alternatively, the procedure is repeated from Step 4 or Step 1 for inquiring another instrument.

At Step 6, the receiver establishes a p-to-p connection to have a data transmission line to the target instrument and starts receiving the data from the output plug in action. The ISOCH_IO_WISH command notifies that "the effective data is released upon initiation of a connection" and "the received data is utilized without waste", hence requiring no change in the internal connection.

If no output plugs of the instruments are available for transmitting the desired signal format or no output demand is presented, the receipt of the data from the instruments is disabled and the receiver quits its data receiving action. Then, the receiver can proceed another action, e.g. monitoring the conditions of an instrument which receives a signal from another instrument or the status of a plug with no output demand.

A procedure of breaking the data transmission line established by the above procedure to terminate the receipt of the data when the data is no more desired for output or input will now be described. As the p-to-p connection is established by the receiver in this embodiment, it can be broken by only the receiver.

When the data is no more desired to be received by the receiver, the p-to-p connection is broken by the receiver. The transmitter detects that the p-to-p connection is broken and then proceed another action such as stopping its transmitting action.

When the transmitter intends to quit the data transmission, it informs the receiver of the end of the data transmission and allows the receiver to break the connection as the transmitter disables to break the p-to-p connection established by the receiver. More particularly, the ISOCH_IO_WISH notify command, which is described previously, is used for the purpose. When the data transmission is commenced, the receiver delivers the ISOCH_IO_WISH notify command to the transmitter again. In turn, the transmitter when its output plug deletes the output demand returns back the command as the final response to the receiver with the opN bit shifted to 0. Alternatively, when switching the signal format to another, the transmitter sends the final response to the receive with the o_sig bit shifted to 1.

The receiver upon receiving the response finds that the output plug in action is not engaged with the data transmission and breaks the p-to-p connection to the plug. When the p-to-p connection to all of the receivers is broken, the transmitter proceeds another action such as terminating the data transmission. When the o_sig bit is shifted to 1, the receiver addresses the OUTPUT_PLUG_SIGNAL_FORMAT status command for checking whether or not the signal format at the plug linked over the p-to-p connection established by the receiver is changed. If the format is changed, the p-to-p connection to the plug is broken. When not changed, the p-to-p connection remains intact.

Embodiment 4

This embodiment is differentiated from Embodiment 3 by the fact that the p-to-p connection is replaced with broadcast connections for establishing the transmission line. The procedure from Step 1 to Step 5 is identical to that of Embodiment 3 and will be explained in no more detail.

In this embodiment, the receiver feeds the transmitter with the DIGITAL_OUTPUT command having connection_state set to 70 (establish) and allows the transmitter to establish a broadcast out connection. At the time, when the receiver desires to specify the number of a channel, it assigns the broadcase_channel_base field in the oMPR. The receiver identifies the number of the channel on which the data is received and then establishes a broadcast in connection for starting the data input. As both the broadcast in connection and the broadcast out connection are established over the single channel, the transmission line is developed between the transmitter and the receiver.

A procedure of breaking the transmission line established by the above procedure to terminate the data input when the data transmission or receipt is no more needed will now be described. As the broadcast connections are utilized in this embodiment, the transmitter when finds the end of the data transmission can break the broadcast out connection to terminate the data transmission. The receiver then detects no transmission of the data and may proceed another action such as stopping its receiving action.

When the receiver desires no more input of the data, it can simply break the broadcast in connection. Also, when the receiver intends to avoid useless data transmission after its data input is broken, it feeds the transmitter with the DIGITAL_OUTPUT command having connection_status set to 60 (break) and allows the transmitter which is not capable to identify the receiver in action to break the broadcast out connection to the receiver. The broadcast out connection may also be broken by clearing off the connection_counter bit in the oPCR to zero. Alternatively, the ISOCH_IO_WISH notify command described previously may be used for informing the transmitter of no more receiving the data and allowing the transmitter to stop the data transmission. In case that another instrument(s) is receiving the data broadcasted by the transmitter over the channel, the receiver may preferably call the iPCR of each instrument to check whether or not the instrument is linked by a broadcast in connection to the channel before it directs the transmitter to break the broadcast out connection.

According to the procedures described with Embodiment 3 and 4, the receiver can manage to establish and break the data transmission line, hence determining useless data transmission before actual receipt of the data and, when no more input is desired, breaking the data transmission to avoid such a useless data transmission.

In the flowchart shown in FIG. 2, the commands for inquiring the quantity of input plugs, the support to a desired signal format, the standby for data input, and the receipt of another signal are not limited to those of this embodiment and may be in any form capable of pursuing the inquiries. The ISOCH_IO_WISH notify command applied as shown in FIG. 7 may be replaced by repeating the status command or a single command which carries the selection of the signal format and a group of the inquiries. For example, the ISOCH_IO_WISH notify command is added with the fmt and fdf fields allowing the receiver to issue the demand for data transmission based on the signal format defined by the fmt and fdf fields upon receiving the notify command.

In that case, when the signal format is changed with the demand for data transmission being maintained, the bit at each port is cleared off to 0 and thus the assignment of bits to i_sig and o_sig may not be needed. Also, the sequence of the inquiries is not limited to that of this embodiment of the present invention and may arbitrarily be modified.

Although the transmission line is established by, but not limited to, the receiver for receiving the data in Embodiment 3 and 4, it may be established by the transmitter.

For example, when the receiver identifies an available output plug and demands a instrument with the plug for starting the data transmission, the instrument available for the data transmission in turn establishes a data transmission line and transmits the data.

Embodiment 5

A procedure of a third instrument, which is not engaged with the input or output of an AV data, identifying a instrument for transmitting the data and a instrument for receiving the data and establishing a data transmission line between the two instruments will now be described referring to FIG. 3.

At Step 1, the third instrument addresses a PLUG_INFO status command to each instrument for inquiring the quantity of available input or output plugs. As the third instrument manages the isochronous transmission, a command shown in FIG. 5A is used for examining the quantity of serial bus input or output plugs on a target instrument. When no input or output plugs are available on the instrument, the inquiry is shifted to another instrument.

When the input or output plugs are available, the procedure goes to Step 2 where the third instrument issues an INPUT_PLUG_SIGNAL_FORMAT inquiry command and an OUTPUT_PLUG_SIGNA_FORMAT inquiry command for inquiring each the plug of the target instrument whether it supports the signal form at of a data of interest, e.g. whether the input or output plug accepts the data of "NTSC (525/60) compatible DV format". If no plugs of the target instrument support the format of the data of interest (i.e. the response indicates "not implemented"), the target instrument is not available for the data transmission and the procedure is repeated from Step 1 of FIG. 3 for inquiring another instrument.

When the input plug capable of receiving the signal format of the data of interest or the output plug capable of transmitting the signal format of the data, a list of the available plugs of the target instrument for supporting the transmission of the data in the signal format is made at Step 3. The check up is repeated until all the plugs of the target instrument are listed.

As the list is completed, the procedure moves to Step 4 where the ISOCH_IO_WISH command is issued for inquiring whether or not the plug is ready for data output. It is also found from the bit in the response which plug has output demand. When the notify command is issued for the purpose, it can be used as a response when the status of the output plug is changed and when the signal format at the output plug is changed.

It is acknowledged from the bit in the response which plug has output demand. When the notify command is issued for the purpose, it can be used as a response when the status of the output plug is changed and when the signal format at the output plug is changed.

When the output plug having output demand is found, the procedure advances to Step 5 of FIG. 3 where it is judged from the oPCR of the output plug whether or not the plug is in action for transmitting the data.

When the data is being transmitted, it is then examined whether or not the data is in a desired signal format. When the data is in the desired format, the data input is ready and the procedure goes to Step 10. If the data is not in the desired format, the receiver issues an OUTPUT_PLUG_SIGNAL_FORMAT control command for demanding change of the output plug to the desired signal format. It is desired at the time to confirm that no p-to-p connection or no broadcast connection to any other instrument is developed.

It may happen that the signal format at the output plug is not successfully changed to the desired format due to the conditions of the receiver instrument. In that case, the OUTPUT_PLUG_SIGNAL_FORMAT notify command is issued for demanding the change of a signal format at the output plug to the desired format. Alternatively, the procedure may be repeated from Step 1 for inquiring another instrument.

When a plug which is ready for data output is found, the procedure goes to Step 7 of FIG. 3 where the ISOCH_IO_WISH command is issued for inquiring which plug is ready for data input. It is also found from the bit in the response which plug has input demand. When the notify command is issued for the purpose, it can be used as a response when the status of the input plug is changed and when the signal format at the input plug is changed.

It is acknowledged from the bit in the response which plug has input demand. When the notify command is issued for the purpose, it can be used as a response when the status of the input plug is changed and when the signal format at the input plug is changed.

When the input plug having input demand is found, the procedure advances to Step 8 of FIG. 3 where it is judged from the iPCR of the plug whether or not the plug is in action for receiving from another instrument. When no receiving action is made, the data input is ready and the procedure moves to Step 10. When the receiving action is made, the inquiry is shifted to another plug having input demand. If no input plugs having input demand are found, the procedure is repeated from Step 1 for inquiring another instrument.

At Step 10 of FIG. 3, the third instrument reviews the information about all the plugs (or the plugs of interest) and establishes a p-to-p connection between the available output plug and the available input plug. Since the ISOCH_IO_WISH command can indicate "the connection allows transmission of a valid data" and "the input data is utilized at its entirety as not wasted", the internal connection is not needed for modification.

If the transmission of the data is rejected because of no input or output plug of each instrument accepting the signal format of the data, demanding the input or output of the data, or being in action for receiving or transmitting another data, the third instrument establishes no data transmission line. The third instrument may proceed another action such as repeatedly issuing the ISOCH_IO_WISH notify command to monitor the instruments in action for receiving and transmitting data with other instruments or the plugs having no input or output demand.

A procedure of the third instrument breaking the data transmission line established by the above procedure to terminate the data transmission when the transmission or receipt of data is no more needed will now be described. In this embodiment, the third instrument establishes the p-to-p connection and thus is responsible for breaking the p-to-p connection.

When the third instrument finds the no more data transmission is needed, it breaks the p-to-p connection. The transmitter or the receiver may then proceed anther action such as terminating its transmitting or receiving action according to the content of its oPCR or iPCR.

When the receiver intends to terminate the data input but is not eligible to directly break the p-to-p connection established by the third instrument, it has to notify the third instrument that the data input is no more needed and allows the third instrument to break the p-to-p connection. Upon the data transmission starting, the third instrument feeds the receiver with the ISOCH_IO_WISH notify command. This permits the receiver, when its input plug requires no input of the data, to shift the bit of ip00 to ip30 to 0 for the plug and return the notify command as a response. Also, when the receiver intends to change the signal format, it shifts the bit of i_sig to 1 and returns the notify command as a response. The third instrument then acknowledges from the response that the input plug in action has no more demands the data input and breaks the p-to-p connection to the plug.

Similarly, when the transmitter intends to terminate the data output but is not eligible to directly break the p-to-p connection established by the third instrument, it has to notify the third instrument that the data output is no more needed and allows the third instrument to break the p-to-p connection. Upon the data transmission starting, the third instrument feeds the transmitter the ISOCH_IO_WISH notify command. This permits the transmitter, when its output plug requires no more output of the data, to shift the bit of op00 to op30 to 0 for the plug and return the notify command as a response. Also, when the transmitter intends to change the signal format of the data output, it shifts the bit of o_sig to 1 and returns the notify command as a response. The third instrument then acknowledges from the response that the output plug in action has no more demands the data output and breaks the p-to-p connection to the plug. To avoid useless data transmission thereafter, the third instrument may direct the transmitter to terminate its transmitting action when the instruments receiving the data from the transmitter over the p-to-p connections all quit their actions. When the bit of i_sig or o_sig is shifted to 1, the third instrument uses a control command for directing the target instrument to switch to the transmission/receipt signal format. If the command is ignored by the target instrument, the p-to-p connection may be terminated by the third instrument.

Although the action in this embodiment is carried out for searching the input instrument when the output instrument is found available with a desired signal format, it may be modified for searching the output instrument when the input instrument having input demand is found. Also, a list of the available input and output plugs may be made when the input and output plugs have been set ready for the data transmission. Moreover, although the p-to-p connection is established after a signal format is specified and the list of the plugs is made in the embodiment, the signal format may not particularly be specified but switched to a format in action just before the p-to-p connection.

Embodiment 6

This embodiment is differentiated from Embodiment 5 by the fact that the p-to-p connection is replaced by broadcast connections for develop the data transmission line. The procedure from Step 1 to Step 5 is identical to that of Embodiment 5 and will be described in no more detail.

In this embodiment, the third instrument addresses a DIGITAL_OUTPUT command having connection_state set to 70 (establish) for directing the transmitter to establish a broadcast out connection at Step 6 of FIG. 3. Simultaneously, the third instrument addresses a DIGITAL_INPUT command having connection_state set to 70 (establish) for directing the receiver to establish a broadcast in connection. In this manner, both the broadcast out connection and the broadcast in connection are established over a single channel hence developing the data transmission line between the transmitter and the receiver. The procedure of establishing the broadcast in and out connections is identical to that described with Embodiments 2 and 4 and will be explained in no more detail.

A procedure of breaking the data transmission line established by the above procedure and terminating the data input when the data input or the data output is no more desired will now be described. In this embodiment, the broadcast connections are utilized and when the transmitter intends to stop its transmitting action, it only breaks the broadcast out connection to terminate the data transmission. The receiver may detect no input of the data and stop its action.

When the receiver desires no more input of the data, it only breaks the broadcast in connection. To avoid further useless data transmission after the receiver stops its receiving action but the transmitter disables to acknowledge the other instrument(s) receiving the data, the receiver may issue a DIGITAL_OUTPUT command having connection_state set to 60 (break) for directing the transmitter to break the broadcast out connection. It is also possible that the receiver directly clears off to zero the broadcast_connection_counter in the oPCR of the transmitter. Alternatively, as the transmitter has addressed the ISOCH_IO_WISH notify command described previously to the receiver, the receiver may inform the transmitter of no more requirement of the data input allowing the transmitter to terminate the data transmission. In case that another instrument(s) is receiving the data broadcasted by the transmitter over the channel, the third instrument may preferably call the iPCR of each instrument to check whether or not the instrument is linked by a broadcast in connection to the channel before it directs the transmitter to break the data transmission.

Similarly, when the third instrument intends to break the data transmission line, it may issue the DIGITAL_OUTPUT command having the connection state set to 60 (break) for directing the transmitter to break the broadcast out connection. It is also possible to break the broadcast out connection by the receiver clearing off to zero the broadcast connection counter bit in the oPCR.

According to the procedures described with Embodiment 5 and 6, the third instrument can manage to establish and break the data transmission line, hence determining whether the data transmission is useless or not and, when no more data transmission is desired, breaking the transmission to avoid such a useless transmission.

In the flowchart shown in FIG. 3, the commands for inquiring the quantity of input plugs, the support of a desired signal format, the standby for data input, and the receipt of another signal are not limited to those of this embodiment and may be in any form capable of pursuing the inquiries.

The ISOCH_IO_WISH notify command applied as shown in FIG. 7 may be replaced by repeating the status command or a single command which carries the selection of the signal format and a group of the inquiries. For example, the ISOCH_IO_WISH notify command is added with the fmt and fdf fields allowing the instrument to issue the demand for data transmission based on the signal format defined by the fmt and fdf fields upon receiving the notify command. In that case, when the signal format is changed with the demand for data transmission being maintained, the bit at each port is cleared off to 0 and thus the assignment of bits to i_sig and o_sig may not be needed.

Also, the sequence of the inquiries is not limited to that of this embodiment of the present invention and may arbitrarily be modified.

Figure 10:
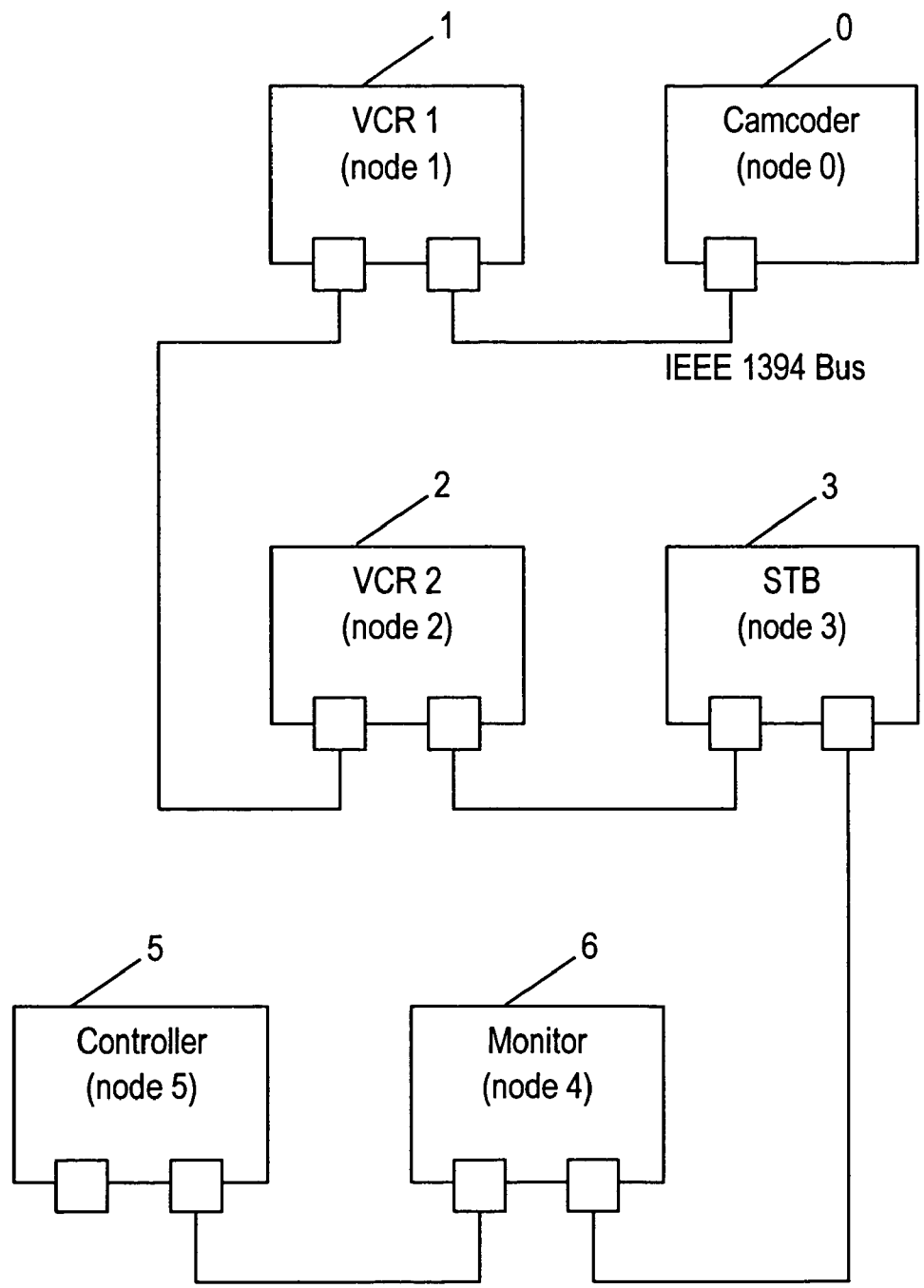
FIG. 10 is a structural diagram showing the structure of a bus system.

Although the management for the data transmission described previously with Embodiments 1 to 6 uses the commands for inquiry, it may be carried out by predetermining attributes of the connection status and, when their change is detected, applying the commands to each instrument to be controlled. For example, in a bus system shown in FIG. 10, whenever the connection status on each instrument is changed, its attribute data are transferred to a controller 5. The controller 5 provides a visual display of the connection status and the data input and data output of the instruments. FIG. 11 is an image diagram showing visually the connections.

What is claimed is:

1. A data transmission management method for use with an IEEE1394 bus system, comprising:
    providing said IEEE1394 bus system having a transmitter and a plurality of instruments linked to each other, the instruments including a target instrument, the target instrument having one or more input plugs for receiving data;
    inquiring from the transmitter, for transmitting data over the IEEE1394 bus system to each of the one or more input plugs of the target instrument, as to whether or not receipt of the data is enabled;
    receiving at the transmitter from the target instrument, a receiving state status response informing of an enable or disable state of receiving the data at each of the one or more the input plugs of the target insrument; and
    if the transmitter receives an enable state at one of the one or more input plugs of the target instrument, allowing the transmitter to establish a data transmission line between the transmitter and the one of the one or more input plugs of the target instrument.

2. A data transmission management method according to claim 1, wherein the receiving state response indicates one of: (i) an enable or disable state of receiving the data at each of the one or more input plugs of the target instrument; and (ii) a change in the enable or disable state at each of the one or more input plugs of the target instrument.

3. A data transmission management method according to claim 1, wherein the transmitter has one or more output plugs,
wherein, upon receiving the receiving state response, the transmitter examines itself whether each of the one or more output plugs of the transmitter is in an enable or disable state of transmitting the data, and
when one of the one or more output plugs of the transmitter is in an enable state, the transmitter establishes a data transmission line between the transmitter and the one of the one or more input plugs of the target instrument.

4. A data transmission management method according to claim 1, wherein the IEEE1394 bus system further includes a second instrument,
wherein the target instrument checks that the transmitter is transmitting the data to the second instrument, and said method further comprising
when the data is being transmitted, establishing the data transmission line between the one of the one or more input plugs of the target instrument and the transmitter.

5. A data transmission management method according to claim 1, wherein the transmitter inquires whether each of the one or more input plugs of the target instrument is in an enable or disable state for receiving a specific format of the data.

6. A data transmission management method according to claim 5, wherein upon being inquired, if each of the one or more input plugs of the target instrument is in a disable state, the target instrument informs the transmitter of being in the disable state.

7. A data transmission management method for use with an IEEE1394 bus system, comprising:
providing an IEEE1394 bys system having a plurality of instruments linked to each other, the plurality of the instruments including a receiver for receiving data over the IEEE1394 bus system and a target instrument having one or more output plugs for outputting data over the IEEE1394 bus system;
inquiring from the receiver, as to whether or not transmission of data is enabled at each of the one or more output plugs of the target instrument;
receiving at the receiver a transmitting state response informing of an enable or disable state of transmitting the data at each of the one or more output plugs of the target instrument; and
if the receiver receives an enable state from one of the one or more output plugs of the target instrument allowing the receiver to establish a data transmission line between the receiver and the one of the one or more output plugs of the target instrument.

8. A data transmission management method according to claim 7, wherein the transmitting state response indicates one of: (i) an enable or disable state for transmitting the data and (ii) a change in the enable or disable state.

9. A data transmission management method according to claim 7, wherein the receiver has one or more input plugs for receiving data, and
wherein upon receiving the transmitting state response, the receiver examines itself whether each of the one or more input plugs is in an enable or disable state for receiving the data,
said method further comprising:
when one of the one or more input plugs of the receiver is in an enable state, establishing a data transmission line between the one of the one or more input plugs of the receiver and the one of the one or more output plugs of the target instrument.

10. A data transmission management method according to claim 7, wherein the target instrument establishes the data transmission line between the target instrument and the receiver, and
wherein the target instrument transmits the data to the receiver from the one of the one or more output plugs of the target instrument.

11. A data transmission management method according to claim 7, wherein the receiver inquires whether each of the one or more output plugs of the target instrument is in an enable or disable state for transmitting a specific format of the data.

12. A data transmission management method according to claim 11, wherein upon being inquired, if each of the one or more output plugs of the target instrument is in a disable state for transmitting the specified format of the data, the target instrument informs the receiver of the disable state for transmitting the specific format of the data.

13. A data transmission management method for use with an IEEE1394 bus system, comprising:
providing an IEEE1394 bus system having a plurality of instruments linked to each other, the instruments including a first instrument, a second instrument, and a third instrument, the first instrument having one or more output plugs, the second instrument having one or more input plugs, the third instrument neither conducting transmission nor receipt of data;
inquiring from the third instrument as to at least one of (i) whether or not the transmission of the data is enabled at each of the one or more output plugs of the first instrument and (ii) whether or not the receipt of the data is enabled at each of the one or more input plugs of the second instrument;
receiving at the third instrument a transmitting state response from the first instrument informing of an enable or disable state of transmitting the data at each of the one or more output plugs of the first instrument;
providing the third instrument with a receiving state response from the second instrument informing of an enable or disable state of receiving the data at each of the one or more input plugs of the second instrument; and
if the third instrument receives an enable state of transmitting data at one of the one or more output plugs of the first instrument and an enable state of receiving data at the one of the one or more input plugs of the second instrument, allowing the third instrument to establish a data transmission line between the one of the one or more output plugs of the first instrument and the one of the one or more input plugs of the second instrument.

14. A data transmission management method according to claim 13, wherein the receiving state response indicates one of: (i) an enable or disable state for receiving the data at each of the one or more input plugs of the second instrument; and (ii) a change in the enable or disable state at each of the one or more input plugs of the second instrument, and the transmitting state response indicates one of; (i) an enable or disable state for transmitting the data at each of the one or more output plugs of the first instrument; and (ii) a change in the enable or disable state at each of the one or more output plugs of the first instrument.

15. A data transmission management method according to claim 13, wherein the third instrument inquires whether each of the one or more output plugs of the first instrument is in an enable state for transmitting a specific format of data, and
wherein the third instrument inquires whether each of the one or more input plugs of the second instrument is in an enable or disable status for receiving the specific format of the data.

16. A data transmission management method according to claim 15, wherein upon being inquired, if the one of the one or more output plugs of the first instrument is in a disable state for transmitting the specified format of the data, the first instrument informs the third instrument of the disable state of transmitting the specific format of the data, and
wherein, upon being inquired, if the one of the one or more input plugs of the second instrument is in a disable state for receiving the specified format of the data, the second instrument informs the third instrument of the disable state of receiving the specific format of the data.

17. A data transmission management method according to claim 13, wherein when receiving the transmitting state response indicating that the transmission of the data is ready earlier than the receiving state response indicating that the receipt of the data is ready,
the third instrument examines whether the first instrument which is ready or not for transmission of the data, before establishing the data transmission line.

18. A data transmission management method according to claim 13, wherein when receiving the receiving state response indicating that the receipt of the data is ready earlier than the transmitting state response indicating that the transmission of the data is ready,
the third instrument examines whether the second instrument is ready or not for receipt of the data, before establishing the data transmission line.

19. A data transmission management method according to claim 1, wherein the receiving state response includes a notice of a change of a signal format of data to be transmitted is changed.

20. A data transmission management method according to claim 12, wherein the receiving state response includes a notice of a change of a signal format of data to be transmitted, and
the transmitting state response indicates one of: (i) an enable or disable state for transmitting the data and (ii) a change in the enable or disable state.

21. A data transmission management method for use with a bus system having a plurality of instruments linked to each other, comprising:
inquiring from a transmitter, which is an instrument for transmitting data over the bus system, as to whether or not receipt of the data is enabled;
receiving at the transmitter a receiving state status response informing of an enable or disable state of receiving the data; and
allowing the transmitter to establish a data transmission line between the instruments according to the receiving state response,
wherein the receiving state response includes a notice of a change of a signal format of data to be transmitted is changed.

22. A data transmission management method according to claim 21, wherein the receiving state response includes one of an enable or disable state of receiving the data and a change in the enable or disable state.

23. A data transmission management method according to claim 2, wherein upon receiving the receiving state response, the transmitter examines itself whether it is in an enable or disable state of transmitting the data, and
when it is in its enable state, establishes the data transmission line between the transmitter and the target instrument which delivers the receiving status response.

24. A data transmission management method according to claim 21, wherein the target instrument which delivers the receiving state response checks that the transmitter is transmitting the data, and
when the data is being transmitted, establishes the data transmission line between the target instrument and the transmitter.

25. A data transmission management method according to claim 21, wherein the transmitter inquires whether the target instrument is in an enable or disable state for receiving a specific format of the data.

26. A data transmission management method according to claim 25, wherein upon being inquired, if the target instrument is in disable state, the target instrument informs the transmitter of being in the disable state.

27. A data transmission management method according to claim 21, wherein the bus system is IEEE1394.

28. A data transmission management method for use with a bus system having a plurality of instruments linked to each other, comprising:
inquiring from a third instrument, which neither conducts transmission nor receipt of data, as to at least one of whether or not the transmission of the data is enabled and whether or not the receipt of the data is enabled;
providing the third instrument with both a transmitting state response and a receiving state response of the target instruments informing of an enable or disable state of transmitting the data and of an enable or disable state of receiving the data respectively; and
allowing the third instrument to establish or break a data transmission line between the instrument delivering the transmitting state response and the instrument delivering the receiving state response, according to the transmitting or receiving state response,
wherein when receiving the transmitting state response indicating that the transmission of the data is ready earlier than the receiving state response indicating that the receipt of the data is ready, and
the third instrument examines whether the target instrument which delivers the transmitting status response is ready or not for transmission of the data, before establishing the data transmission line.

29. A data transmission management method according to claim 28, wherein the receiving state response includes one of an enable or disable state for receiving the data and a change in the enable or disable state, and the transmitting state response includes one of an enable or disable state for transmitting the data and a change in the enable or disable state.

30. A data transmission management method according to claim 28, wherein the third instrument inquires whether the target instrument is in an enable or disable status for transmitting or receiving a specific format of the data.

31. A data transmission management method according to claim 28, wherein upon being inquired, the target instrument informs the third instrument of its disable state of transmitting or receiving the specific format of the data if so.

32. A data transmission management method according to claim 28, wherein when receiving the receiving state response indicating that the receipt of the data is ready earlier than the transmitting state response indicating that the transmission of the data is ready, the third instrument examines whether the target instrument which delivers the receiving status response is ready or not for receipt of the data, before establishing the data transmission line.

33. A data transmission management method according to claim 28, wherein the bus system is IEEE1394.

34. A data transmission management method according to claim 28, wherein the receiving state response includes a notice of a change of a signal format of data to be transmitted, and the transmitting state response includes one of an enable or disable state for transmitting the data and a change in the enable or disable state.

35. A data transmission management method for use with a bus system having a plurality of instruments linked to each other, comprising:

inquiring from a third instrument, which neither conducts transmission nor receipt of data, as to at least one of whether or not the transmission of the data is enabled and whether or not the receipt of the data is enabled;

providing the third instrument with both a transmitting state response and a receiving state response of the target instruments informing of an enable or disable state of transmitting the data and of an enable or disable state of receiving the data respectively; and allowing the third instrument to establish or break a data transmission line between the instrument delivering the transmitting state response and the instrument delivering the receiving state response, according to the transmitting or receiving state response, wherein when receiving the receiving state response indicating that the receipt of the data is ready earlier than the transmitting state response indicating that the transmission of the data is ready, and the third instrument examines whether the target instrument which delivers the receiving status response is ready or not for receipt of the data, before establishing the data transmission line.

36. A data transmission management method according to claim 35, wherein the receiving state response includes one of an enable or disable state for receiving the data and a change in the enable or disable state, and the transmitting state response includes one of an enable or disable state for transmitting the data and a change in the enable or disable state.

37. A data transmission management method according to claim 35, wherein the third instrument inquires whether the target instrument is in an enable or disable status for transmitting or receiving a specific format of the data.

38. A data transmission management method according to claim 35, wherein upon being inquired, the target instrument informs the third instrument of its disable state of transmitting or receiving the specific format of the data if so.

39. A data transmission management method according to claim 35, wherein the bus system is IEEE1394.

40. A data transmission management method according to claim 35, wherein the receiving state response includes a notice of a change of a signal format of data to be transmitted, and the transmitting state response includes one of an enable or disable state for transmitting the data and a change in the enable or disable state.

41. A data transmission management method for use with a bus system having a plurality of instruments linked to each other, comprising:

inquiring from a third instrument, which neither conducts transmission nor receipt of data, as to at least one of whether or not the transmission of the data is enabled and whether or not the receipt of the data is enabled;

providing the third instrument with both a transmitting state response and a receiving state response of the target instruments informing of an enable or disable state of transmitting the data and of an enable or disable state of receiving the data respectively; and allowing the third instrument to establish or break a data transmission line between the instrument delivering the transmitting state response and the instrument delivering the receiving state response, according to the transmitting or receiving state response, wherein the receiving state response includes a notice of a change of a signal format of data to be transmitted, and the transmitting state response includes one of an enable or disable state for transmitting the data and a change in the enable or disable state.

42. A data transmission management method according to claim 41, wherein the receiving state response includes one of an enable or disable state for receiving the data and a change in the enable or disable state, and the transmitting state response includes one of an enable or disable state for transmitting the data and a change in the enable or disable state.

43. A data transmission management method according to claim 41, wherein the third instrument inquires whether the target instrument is in an enable or disable status for transmitting or receiving a specific format of the data.

44. A data transmission management method according to claim 41, wherein upon being inquired, the target instrument informs the third instrument of its disable state of transmitting or receiving the specific format of the data if so.

45. A data transmission management method according to claim 41, wherein the bus system is IEEE1394.

* * * * *

UNITED STATES PATENT AND TRADEMARK OFFICE
CERTIFICATE OF CORRECTION

PATENT NO. : 7,032,059 B1
APPLICATION NO. : 09/569150
DATED : April 18, 2006
INVENTOR(S) : Yamada et al.

It is certified that error appears in the above-identified patent and that said Letters Patent is hereby corrected as shown below:

At Column 19, lines 30-31, in claim 17, "instrument which is ready" should read --instrument is ready--

At Column 19, line 46, in claim 20, "according to claim 12" should read --according to claim 13--

At Column 20, line 6, in claim 22, "according to claim 2" should read --according to claim 21--

Signed and Sealed this

Twelfth Day of December, 2006

JON W. DUDAS
*Director of the United States Patent and Trademark Office*